(12) United States Patent
Cho et al.

(10) Patent No.: US 10,941,785 B2
(45) Date of Patent: Mar. 9, 2021

(54) BRUSHLESS DC MOTOR AND DRAIN PUMP HAVING THE SAME

(71) Applicant: LG ELECTRONICS INC., Seoul (KR)

(72) Inventors: Sangyoung Cho, Seoul (KR); Changsub Kim, Seoul (KR); Seonjoong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 65 days.

(21) Appl. No.: 16/393,688

(22) Filed: Apr. 24, 2019

(65) Prior Publication Data
US 2019/0383303 A1   Dec. 19, 2019

(30) Foreign Application Priority Data
Jun. 14, 2018  (KR) .......................... 10-2018-0068277

(51) Int. Cl.
*H02K 5/124* (2006.01)
*H02K 21/16* (2006.01)
*H02K 7/14* (2006.01)
*F04D 29/12* (2006.01)
*F04D 29/06* (2006.01)
*F04D 29/08* (2006.01)
(Continued)

(52) U.S. Cl.
CPC ......... *F04D 29/128* (2013.01); *F04D 29/061* (2013.01); *F04D 29/086* (2013.01); *F16J 15/324* (2013.01); *H02K 5/124* (2013.01); *H02K 21/16* (2013.01); *D06F 39/085* (2013.01)

(58) Field of Classification Search
CPC .... F04D 29/128; F04D 29/061; F04D 29/086; F04D 13/06; F04D 29/126; F16J 15/324; H02K 5/124; H02K 21/16; H02K 7/14

USPC .......................................................... 310/89
See application file for complete search history.

(56) References Cited

U.S. PATENT DOCUMENTS 4,569,638 A     2/1986  Harker et al.
4,904,166 A *   2/1990  Wasemann ............ F04D 29/628
                                                        417/360
(Continued)

FOREIGN PATENT DOCUMENTS

KR   10-2011-0125098    11/2011

OTHER PUBLICATIONS

European Search Report dated Nov. 6, 2019 issued in EP Application No. 19174634.6.

*Primary Examiner* — John K Kim
(74) *Attorney, Agent, or Firm* — Ked & Associates, LLP (57) ABSTRACT

A motor includes a first housing having a groove, a rotor inserted into the groove and rotatably provided outside the first housing, a second housing coupled to the first housing to form a space together with an outer circumferential surface of the groove, a stator provided in the space, a rotation shaft coupled to the rotor and extended in one direction, and a sealer coupled to the first housing to surround the rotation shaft. The sealer includes a base rotatably coupled to the rotation shaft, a gasket brought into contact with an outer circumferential surface of the rotation shaft, and a cover coupled to the base to fix the gasket to the base. The base includes a first annular protruding portion spaced apart from the rotation shaft to support the gasket, and a second annular protruding portion spaced apart from the first annular protruding portion to support the gasket.

21 Claims, 9 Drawing Sheets

(51) Int. Cl.
*F16J 15/324* (2016.01)
*D06F 39/08* (2006.01)

(56) References Cited

U.S. PATENT DOCUMENTS

| | | | |
|---|---|---|---|
| 2012/0006070 A1* | 1/2012 | Song | D06F 37/206 |
| | | | 68/140 |
| 2012/0183421 A1* | 7/2012 | Kim | H02K 7/14 |
| | | | 417/423.7 |
| 2017/0082117 A1* | 3/2017 | Zhou | F04D 29/5813 |
| 2019/0085849 A1* | 3/2019 | Sinico | F04D 29/426 |
| 2019/0383303 A1* | 12/2019 | Cho | F04D 13/06 |
| 2020/0003216 A1* | 1/2020 | Cho | A47L 15/4225 |

* cited by examiner

BRUSHLESS DC MOTOR AND DRAIN PUMP HAVING THE SAME

CROSS-REFERENCE TO RELATED APPLICATION(S)

This application claims priority under 35 U.S.C. § 119 to Korean Application No. 10-2018-0068277 filed on Jun. 14, 2018, whose entire disclosure is hereby incorporated by reference.

BACKGROUND

1. Field

The present disclosure relates to a brushless direct current (BLDC) motor and a drain pump having the same. In particular, the present disclosure relates to a drain pump provided in a laundry treating apparatus (or washing machine), a dishwasher, and other household appliance to drain and/or circulate water or other fluids.

2. Background

A laundry treating apparatus is a device that receives clothing, bedding, etc. (hereinafter, referred to as laundry) and performs various processes, such as washing, rinsing, spinning, drying, etc., to remove contaminants from the laundry Similarly, a dishwasher performs various processes such as washing, rinsing, drying etc. to clean tableware received in the dishwasher.

A drain pump may be used in these or other types of household appliances. In certain appliances, a circulation pump to circulate fluid within the appliance and a drain pump to drain fluid out of the appliances may be integrally constructed.

Fluid to be drained from household appliances may contain various types of foreign substances, such as a detergent, dirt, and dissolved minerals. After the drain pump has been used for an extended time, the pump may fail due to the foreign substances contained in the water.

Specifically, as a cumulative driving time of the drain pump is increased, foreign objects such as sediment contained in water may accumulate in the drain pump. Furthermore, fluid water containing sediments may penetrate into a rotor side of the drain pump. The fluid and sediments contained in the fluid may interfere with the rotation of the rotor, and thus when the inflow of water to the rotor side is not prevented, a rotation of the rotor may be restricted, thereby resulting in a failure of the drain pump. Thus, when the fluid containing impurities flows into the rotor side of the drain pump during extending driving of the drain pump, the home appliance may malfunction, thereby increasing the inconvenience to a user.

BRIEF DESCRIPTION OF THE DRAWINGS

The embodiments will be described in detail with reference to the following drawings in which like reference numerals refer to like elements wherein.

DETAILED DESCRIPTION

Hereinafter, a drain pump according to an embodiment of the present disclosure will be described in detail with reference to the drawings. Although the following description discusses the drain pump as being included in a laundry treating apparatus 10, it should be appreciated that the drain pump according to the present disclosure is not limited to applications in the laundry treating apparatus 10, and the drain pump may be used in other applications and/or in different devices. As described below, a drain pump according to certain embodiments of the present disclosure may include multiple discharge ports, and the drain pump may be included in or otherwise used with various products in order to discharge a fluid to at least one of the discharge ports using a single motor.

Figure 1:
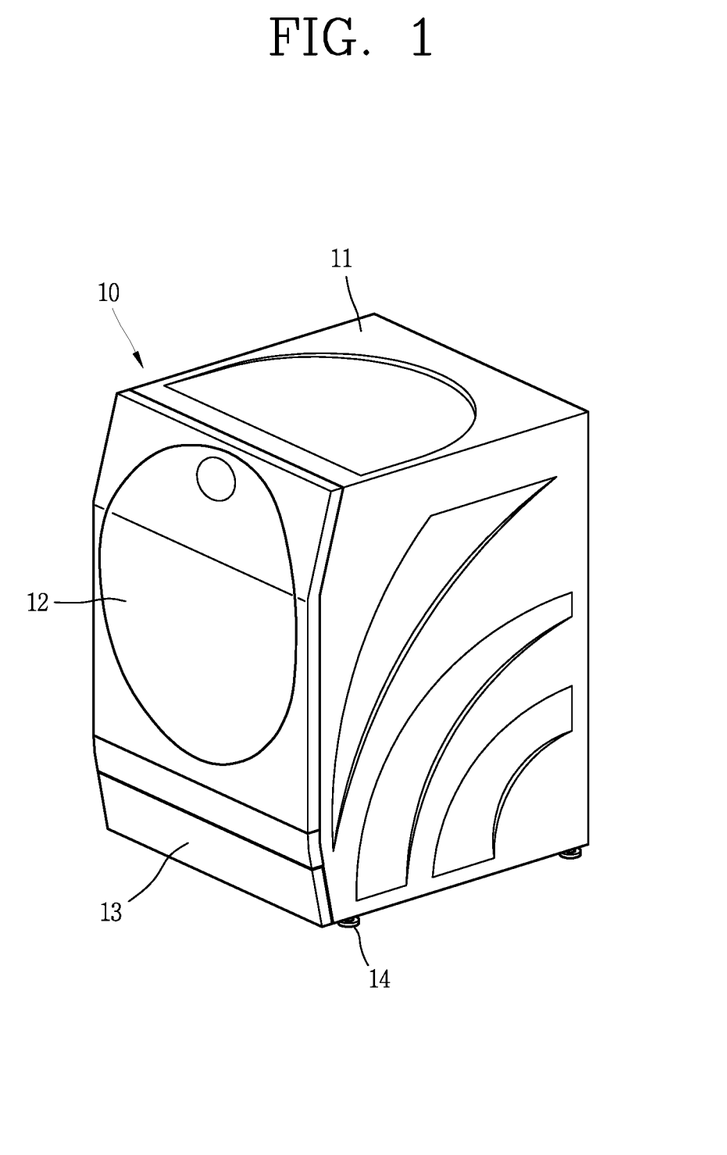
FIG. 1 is a perspective view showing an outer appearance of a laundry treating apparatus according to an embodiment of the present disclosure.

FIG. 1 is a view illustrating an outer appearance of the laundry treating apparatus (commonly referred to as a washing machine), laundry machine, clothes washer, or washer) 10. The laundry treating apparatus 10 may include, for example, a laundry treating apparatus cabinet (or cabinet) 11 forming an outer appearance of the laundry treating apparatus 10, a drum 21 rotatably mounted in the cabinet 11 and defining a cavity to receive laundry thereinto, a lifter (not shown) provided within and extending from an inner surface of the drum 21, and a door 12 provided on a front surface of the cabinet 11 to enclose the cavity defined by the drum 21. In addition, a detergent inlet cover 13 to cover a detergent inlet (not shown) may be positioned below the door 12 on the cabinet 11. Moreover, the laundry treating apparatus 10 may include a duct 15 and a heat exchanger (not shown) to circulate air to dry laundry accommodated in the drum 21.

A storage container or drawer (not shown) that may be drawn out of the cabinet 11 to accommodate items used in the laundry treating apparatus 10 such as detergent and/or fabric softener; elastic members and a damper (not shown) to support the drum 21 and to suppress vibration; and/or a driving motor (not shown) to provide a driving force to rotate the drum 21 may be provided at a lower portion of the laundry treating apparatus 10 (e.g., below the drum 21). Furthermore, the door 12 may be provided on a front surface of the cabinet 11 so that laundry to be washed can be inserted into and taken out of the cabinet 11. The door 12 may be configured to open and close a front surface of the drum 21. The door 12 may have a disk shape. An electric heater (not shown) to heat water when power is applied may be provided in the cabinet 11 and below the drum 21.

A drain pump 100 to drain fluid inside the drum 21 may be provided below the drum 21. Furthermore, a circulation pump (not shown) may be provided below the drum 21 to draw fluid out of the drum 21 and to flow back into an upper region of the drum 21. A filter (not shown) may be provided at one side of the drain pump 100 to collect foreign substances in fluid drawn out of the drum 21. Multiple legs 14 spaced apart from the ground by a predetermined height to support the laundry treating apparatus 10 may be positioned at a lower portion of the laundry treating apparatus 10.

Figure 2:
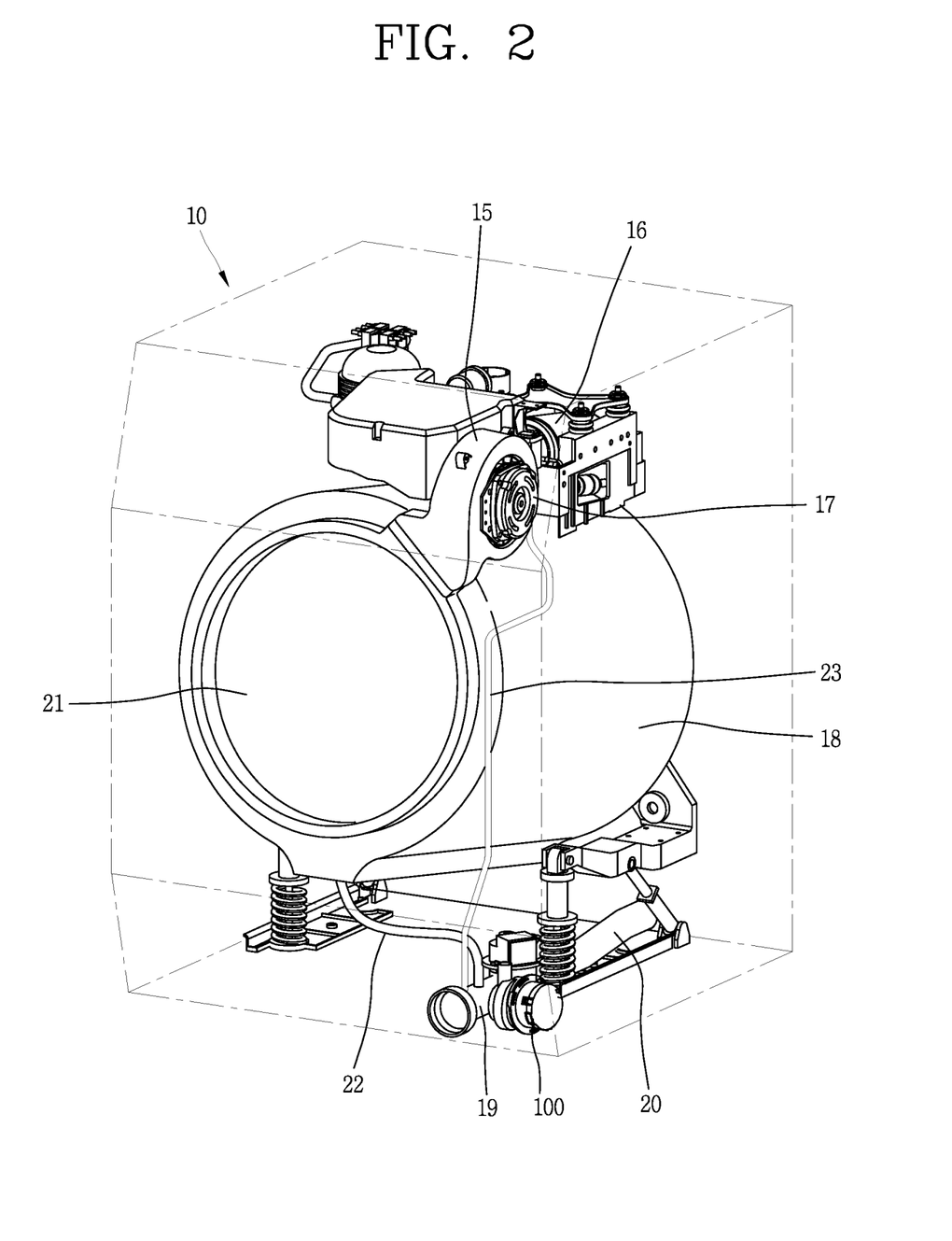
FIG. 2 is a perspective view showing an inner appearance of a laundry treating apparatus including a drain pump according to an embodiment of the present disclosure.

FIG. 2 is a view illustrating an inner appearance of the laundry treating apparatus 10 including the drain pump 100. The laundry treating apparatus 10 includes a cabinet 11 for forming an outer appearance, a tub 18 accommodated in the cabinet 11, and a drum 21 rotatably mounted inside the tub 18 to receive laundry thereinto. Furthermore, to circulate air to dry laundry in the drum 21, the laundry treating apparatus 10 may include a duct 15, a heat exchanger (not shown), and a fan motor 17. For example, the heat exchanger may include a compressor 16 and a compressor support or bracket (not shown) to support the compressor 16 within the cabinet 11. In addition, the laundry treating apparatus 10 may include a condensate discharge pipe 23 to receive condensate generated from air passing through the heat exchanger and to discharge the condensate outside of the laundry treating apparatus 10 as the air is circulated. The laundry treating apparatus 10 may also include a drain pump chamber 19, a drain pump 100, a drain hose 20, and a drain connection pipe (not shown).

The drain pump 100 according to the present disclosure may be positioned at a lower portion of the laundry treating apparatus 10 (e.g., below the tub 18). When fluid in the tub 19 moves to the drain pump chamber 19 and flows into a housing 110 (see FIG. 3) of the drain pump 100, the drain pump 100 may (1) perform a circulation process of moving the fluid through circulation port 111 by the driving a motor of the drain pump 100 to move the fluid back toward the tub 19, or (2) perform a drainage process of moving the inflow fluid toward drain port 112 to discharge the fluid outside of the tub 19.

Referring to FIGS. 1 and 2, a drain pump 100 provided in a drum washer or a front-load-type laundry treating apparatus 10 has been described as a reference. It should be appreciated a sealer described below and a drain pump 100 having the sealer may not be limited to this type of the laundry treating apparatus. For example, drain pump 100 may be used in a top-load-type laundry treating apparatus or other type of home appliance.

Figure 3:
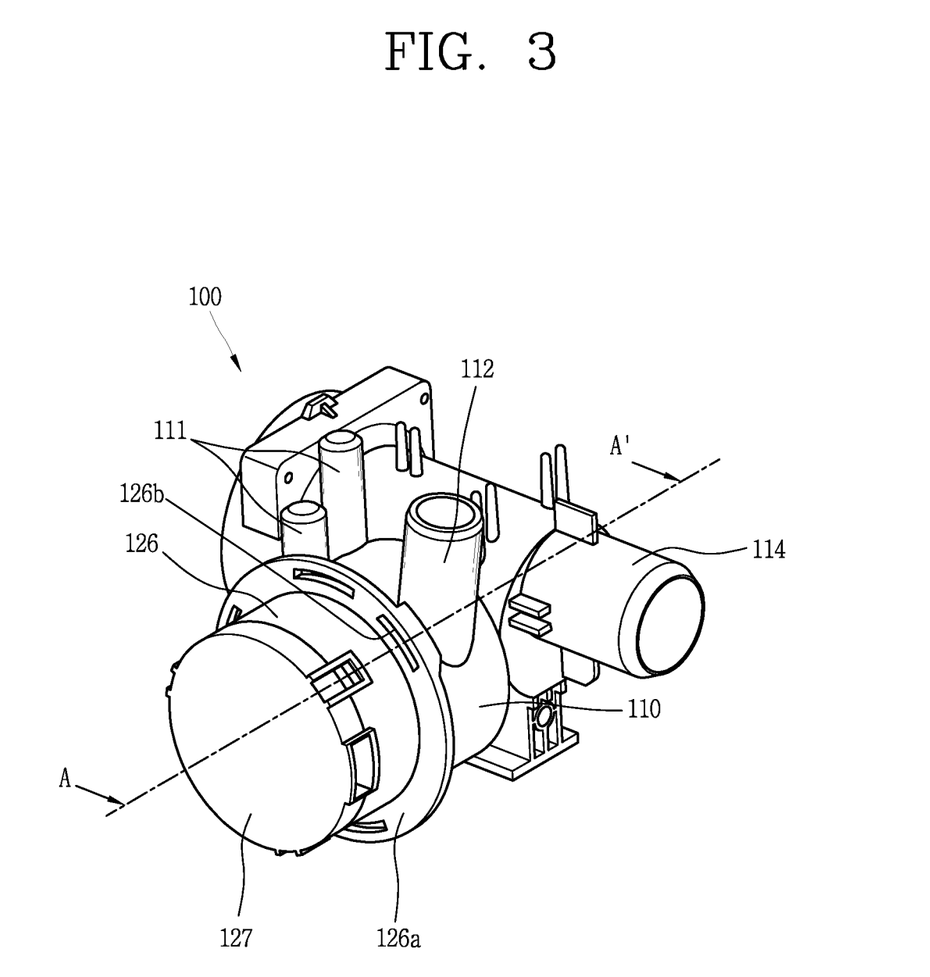
FIG. 3 is a conceptual view showing an outer appearance of a drain pump for a laundry treating apparatus according to an embodiment of the present disclosure.

FIG. 3 is a view illustrating an outer appearance of the drain pump 100 for a laundry treating apparatus 10. The drain pump 100 for a laundry treating apparatus according to one embodiment may include a housing 110 to form an outer appearance of the drain pump 100, an impeller 200 to form a flow of fluid accommodated inside the housing 110, and a motor (not shown) configured to provide driving force to rotate the impeller 125.

As shown in FIG. 3, the housing 110 may be divided into a water flow portion (or inlet chamber) and a drain pump chamber (or outlet chamber). The housing 110 may accommodate water or other fluid. The drain pump chamber may be formed on an inner circumferential surface of the housing 110 to receive or store fluid before the fluid flows into the water flowing portion. The drain pump chamber may receive contaminated fluid (e.g., fluid having dirt, detergent, minerals, etc.) from the tub 18 or receive clean fluid from outside of the tub (e.g., from a water supply). Opposing ends of the drain pump chamber may receive contaminated fluid and clean fluid, respectively.

The water flow portion may be formed on an inner circumferential surface of the housing 110 to circulate fluid introduced from the drain pump chamber back to the tub 18 or to drain fluid out of the laundry treating apparatus 10 so as to form a flow of the introduced fluid from the drain pump chamber. The impeller 200 rotated in an arbitrary direction by the motor may be provided inside the water flow portion. The direction of a flow of fluid the water flow portion 420 may be determined according to the rotational direction of the impeller 200.

In one embodiment, the housing 110 may include a first discharge port 111 and a second discharge port 111 spaced apart from one another to form a moving path of the accommodated fluid. The water flow portion may include an impeller 200 formed on an inner circumferential surface of the housing 110 to form a flow of fluid so that fluid accommodated in the housing 110 is discharged through the first discharge port 111 or discharged through the second discharge port 111. The drain pump chamber may be provided on an inner circumferential surface of the housing 110 to receive or store fluid before the fluid flows into the water flow portion 420.

The drain pump 100 for a laundry treating apparatus 10 according to the present disclosure may selectively perform the functions of a drain pump and a circulation pump, respectively, since the rotational direction of the motor is switchable, in comparison to other types of drain pumps. In addition, since a rotational speed of the motor is controllable, the motor may operate at a relatively high speed in the drainage process and may operate at a relatively low speed in the circulation process as compared with the drainage process, thereby reducing unnecessary noise and power consumption. For example, the drain pump 100 for a laundry treating apparatus according to the present disclosure may selectively move fluid introduced from the drain pump 100 through the drain port 112 or the circulation port 111, thereby selectively performing both the functions of the drain pump and the circulation pump.

As shown in FIG. 3, the housing 110 may form an outer appearance of the drain pump 100 having a cylindrical shape, and a water inlet 114 may be formed at one end of the housing 110 so that fluid can be introduced into the housing 110. A filter (not shown) may be installed on one side or both ends of the water inlet 114 so as to filter foreign substances in the fluid, and then to move through the drain pump 100.

The fluid generated in the washing or drainage process may flow into the housing 110 through the inlet port 114 formed on the housing 110 of the drain pump 100. The fluid contained in the housing 110 may be discharged to the outside through the drain port 112 or the circulation port 111 by the rotating impeller 200, and therefore, the fluid may continuously flow into and through the housing 110.

As illustrated in FIG. 3, an impeller case 126 that fixes the motor (not shown) and the impeller 200 may be installed at the other end of the drain pump 100 (e.g., opposing the inlet port 114). The impeller case 126 may be fixedly coupled to one end of the housing 110 of the drain pump 100. The impeller case 126 may fix the motor (not shown) and the impeller 200. The impeller 200 may be is connected to a rotation shaft of the motor (not shown) and receive a rotational force from a motor (not shown) to rotate inside the drain pump 100.

A flange portion (or flange) 126a protruding outward may be formed on an outer circumferential surface of the impeller case 126. The flange portion 126*a* of the impeller case 126 is formed with a protrusion accommodation portion (or protrusion accommodation recesses) 126*b* so as to be fitted and fixed to one end of the drain pump 100. A protrusion extending from an outer circumferential surface of the housing 110 may be fitted and fixed to the protrusion accommodation portion 126*b*. The protrusion accommodation portion 126*b* may be formed on an outer circumferential surface of the impeller case 126, and several of the protrusion accommodation portions 126*b* may be formed along an outer circumferential surface of the impeller case 126 at regular intervals.

As illustrated in FIG. 3, the impeller case 126 may further include a circular impeller case cover 127 to limit the external exposures of the impeller 125 and the motor (not shown). The protrusion(s) of the housing 110 may be fitted and fixed to the protrusion accommodation portion 126*b* of the impeller case 126, and thus the impeller 125 may rotate within the housing 110 when the impeller case 126 is fixed to the housing 110.

The protrusion(s) may be formed on an outer circumferential surface of the housing 110. The protrusion may be formed to protrude outward from an outer circumferential surface of the housing 110. The protrusions may be formed at regular intervals along an outer circumferential surface thereof to correspond to the protrusion accommodation portions 126*b* of the impeller case 126. The protrusions may be inserted into the protrusion accommodation portion 126*b* formed on the flange portion 126*a* of the impeller case 126, and then rotated and fitted therein so that the impeller case 126 can be fixed to the housing 110.

A first discharge port 111 and a second discharge port 112 formed to protrude from the housing 110 and spaced apart from each other to form a moving path of the accommodated fluid may be provided on an outer circumferential surface of the housing 110. In one implementation, the first discharge port 111 may correspond to a circulation port, and the second discharge port 112 may correspond to a drain port.

The drain port 112 and the circulation port 111 may be respectively formed on an outer circumferential surface of the housing 110. The drain port 112 is configured to communicate with an inside of the housing 110 and protrude in a tangential direction on an outer circumferential surface of the housing 110.

When the drainage process is performed, the drain port 112 serves as a moving path for moving fluid accommodated therein by the rotation of the impeller 200 in one direction. The circulation port 111 may be provided to communicate with an inside of the housing 110 and protrude in a tangential direction on an outer circumferential surface of the housing 110. When the laundry treating apparatus performs a circulation process, the circulation port 111 may serve as a moving path for moving fluid accommodated therein by the rotation of the impeller 200 in a second direction.

For example, the drain port 112 and the circulation port 111 may be formed on an outer circumferential surface of the housing 110, and hoses are connected to the drain port 112 and the circulation port 111, respectively, to serve as a moving path for moving fluid in the drainage process and the circulation process. The drain port 112 and the circulation port 111 may be formed at different positions.

Figure 4:
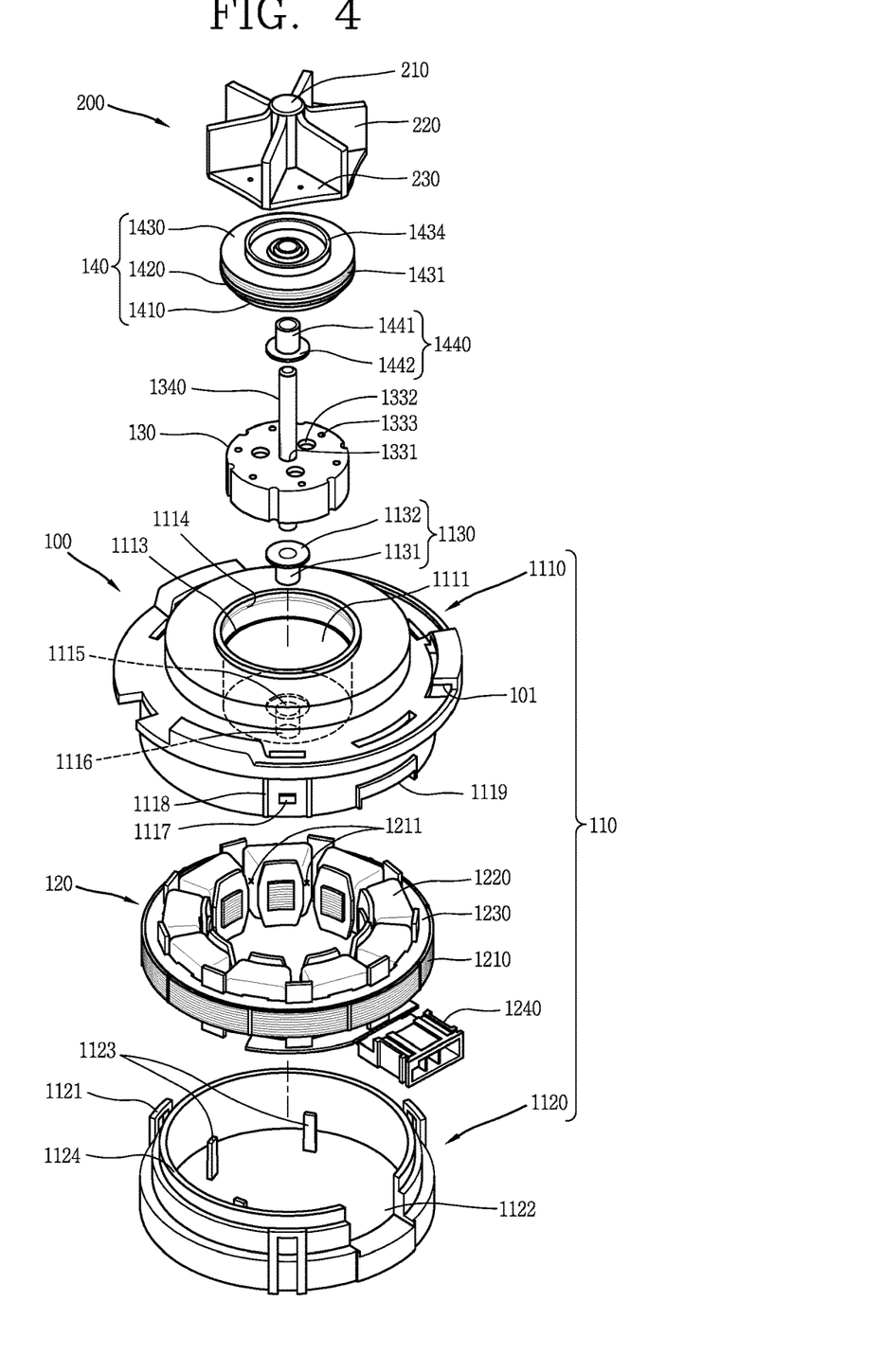
FIG. 4 is an exploded perspective view showing a drain pump according to an embodiment of the present disclosure.
Figure 5:
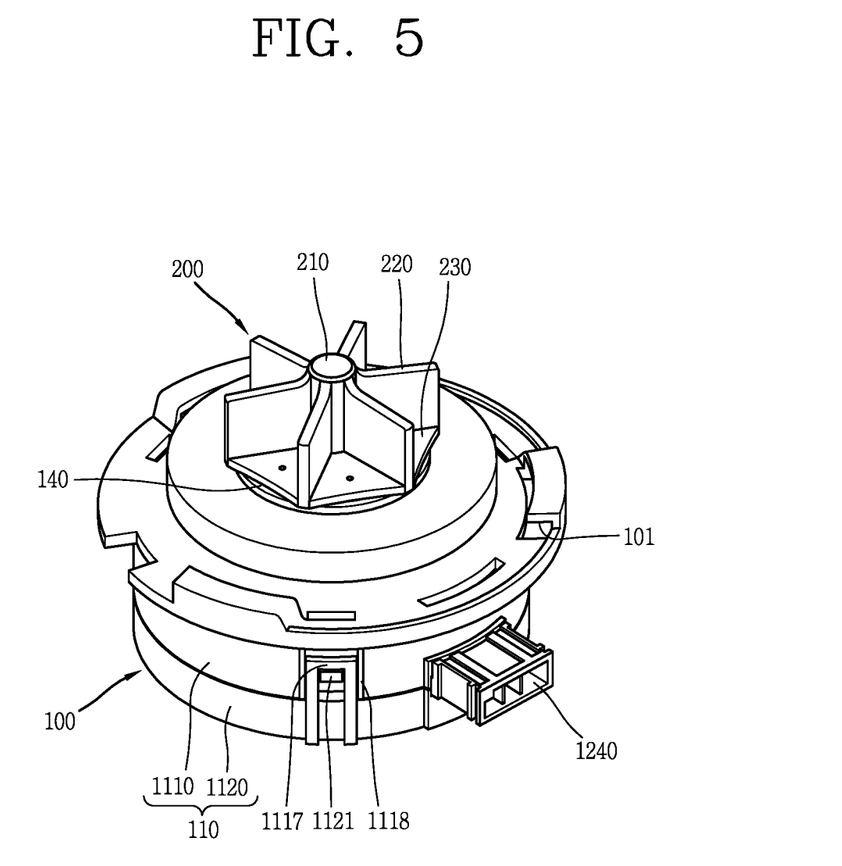
FIGS. 5 and 6 are, respectively, an assembled perspective view and a longitudinal cross-sectional view showing the drain pump according to an embodiment shown in FIG. 4.
Figure 6:
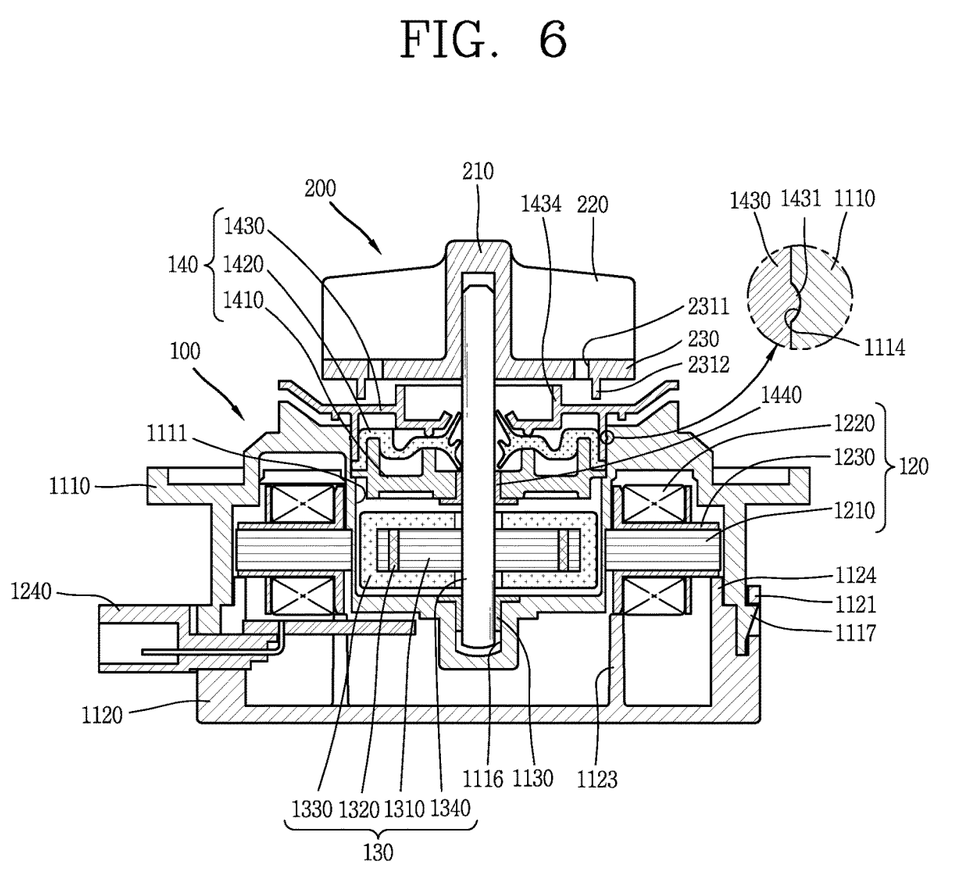

The internal structure of the drain pump 100 will be described below in FIGS. 4-6. Referring to FIGS. 4 through 6, a drain pump 100 according to the present disclosure may be coupled to a drain chamber 19 of a sump to generate a rotational force in one or both directions, and a drain side impeller (hereinafter, abbreviated as an impeller) 200 axially coupled to a rotation shaft 1340 of the drain pump 100 to discharge fluid while rotating.

The drain pump 100 is provided with a stator 120 in a housing 110 having a sealed inner space, and a rotor 130 is rotatably provided outside the housing 110. In one implementation, the stator 120 and the rotor 130 may be separately provided on the inside and the outside of the housing 110, and the drain pump 100 may effectively prevent washing fluid or dirt from flowing into the stator 120.

The housing 110 may include a first housing 1110 having a rotor receiving groove (or opening) 1111 formed on one side surface thereof and an opening surface on the other side surface thereof and a second housing 1120 detachably coupled to the first housing 1110 to cover the opening surface of the first housing 1110 so as to seal an inner space provided with the stator 120.

One side surface of the first housing 1110, that is, an outer side surface facing the drain chamber 19, may be formed with a plurality of fastening protrusions 103 along a circumferential direction thereof and rotatably coupled to a fastening groove 102 of a pump case 101 coupled to the drain chamber 19. Furthermore, the rotor receiving groove 1111 having a predetermined depth in the direction of the second housing is formed at the center of the outer side surface of the first housing 1110 to insert a rotor 130 which will be described later therein. The rotor receiving groove 1111 is formed in a shape that is closed at one side surface thereof in the axial direction, but open at the other side surface thereof, that is, in a direction facing the drain chamber 19.

A stator 120 may be inserted and fixedly coupled to an outer circumferential surface of the rotor receiving groove 1111, that is, an inner space of the housing 110, and the rotor 130 may be rotatably inserted into the rotor receiving groove 1111. In one implementation, the stator 120 and the rotor 130 may be positioned with the housing 110 therebetween, at an inside and an outside thereof, respectively, and the rotor 130 may be positioned in an axial height direction of the stator 120.

One or more ribs 1112 for rotation prevention may be formed on an outer circumferential surface of the rotor receiving groove 1111 at predetermined intervals along a circumferential direction thereof to be positioned between the slots 1211 of the stator core 1210 which will be described later to prevent the stator 120 from moving in the circumferential direction. In addition, a mounting surface 1113 on which the sealer 140 which will be described later is mounted is formed in a stepped manner on an inner circumferential surface of the rotor receiving groove 1111, and a restraining groove 1114 is formed on an upper surface (opening side) of the mounting surface 1113 to insert a restraining protrusion 1431 of the sealer which will be described later thereinto so as to be restrained in an axial direction. Furthermore, a bearing groove 1115 may be formed at the center of a bottom surface of the rotor receiving groove 1111 to insert an end portion of the rotation shaft 1340 of the rotor 130 therein.

Two or more hook protrusions 1117 (in the drawing, three hook protrusions 1117 are illustrated) may be formed on an outer circumferential surface of the first housing 1110 in the circumferential direction, and at least two or more hooking hangers 1121 are formed on an edge surface of the second housing 1120 along the circumferential direction to be attached to and detached from the hook protrusions 1117.

The stator 120 may include a stator core 1210, a coil 1220, and an insulator 1230. The stator core 1210 may be formed by stacking multiple stator sheets having multiple slots 1211 in the circumferential direction in a cylindrical shape. The coils 1220 may be wound around the slots 1211 of the stator core 1210, and the insulator 1230 may be interposed between the stator core 1210 and the coil 1220 to perform insulation. A substrate (not shown) for motor control may be fixed to one side surface of the insulator 1230, and a connector 1240 may be electrically connected to the substrate.

The rotor 130 may include a rotor core 1310, magnets 1320, a molding cover 1330 surrounding the rotor core 1310 and the magnets 1320, and a rotation shaft 1340 integrally coupled to the rotor core 1310 (e.g., the rotation shaft 1340 and the rotor core 1310 are formed as or otherwise coupled together to define a single component). The rotor core 1310 may be formed by stacking rotor sheets having a shaft hole 1311 at the center thereof, and the magnets 1320 are inserted and fixed to a magnet mounting groove 1312 provided in the rotor core 1310. The molding cover 1330 may be formed by surrounding and molding an outer circumferential surface of the rotor core 1310 to support the magnets 1320 in the axial direction. Furthermore, the rotation shaft 1340 may be integrally coupled to the rotor core 1310 to penetrate the molding cover 1330 (e.g., the rotation shaft 1340 and the rotor core 1310 are formed as or otherwise coupled together to define a single component extending through the molding cover 1330).

Figure 7:
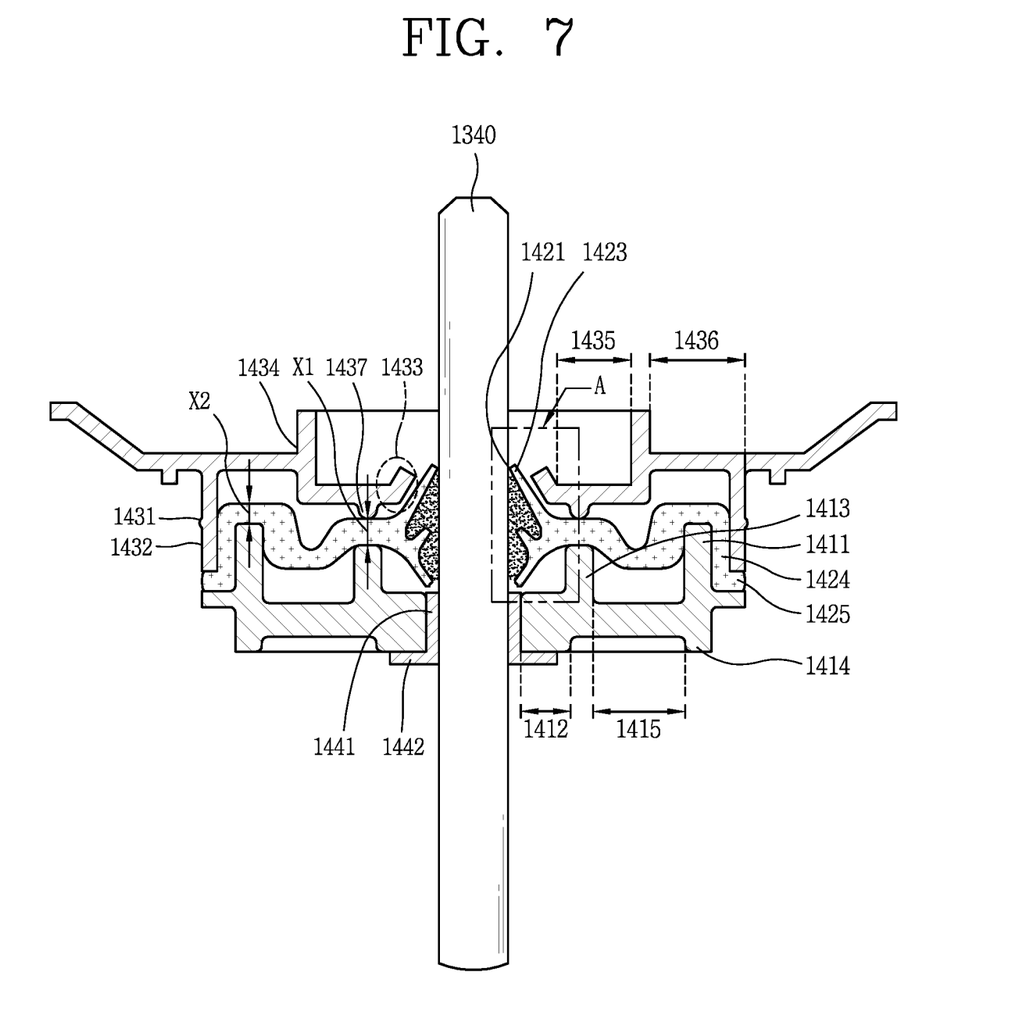
FIG. 7 is a longitudinal cross-sectional view showing a sealer and a housing of a drain pump according to according to an embodiment the present disclosure.

A sealer (or seal) 140 may be provided between the rotor 130 and the impeller 200 to prevent the rotor 130 from being released from the rotor receiving groove 1111 while at the same time preventing washing water from infiltrating into the rotor 130. The structure of the sealer 140 proposed by the present disclosure will be described below in more detail in FIG. 7. Referring to FIG. 7, the sealer 140 may include a sealing base 1410, a gasket 1420, and a sealing cover 1430.

The sealing base 1410 may be rotatably coupled to the rotation shaft 1340 of the rotor 130. An outer circumferential surface of the gasket 1420 may be placed and coupled to the sealing base 1410 to be brought into contact with an inner circumferential surface of the rotor receiving groove 1111, and the sealing cover 1430 may be coupled to the sealing base 1410 by pressing the gasket 1420 so that the gasket 1420 is fixed to the sealing base 1410. The sealing base 1410 and the sealing cover 1430 may be formed of a rigid material molded by resin, while the gasket 1420 may be formed of an elastic material such as rubber.

Furthermore, an annular restraining protrusion 1431 may be formed in an annular shape on an outer circumferential surface of the sealing base 1410 or the sealing cover 1430 (on an outer circumferential surface of the sealing cover in the drawing). The restraining protrusion 1431 may be inserted into the restraining groove 1114 formed in an annular shape on an inner circumferential surface of the rotor receiving groove 1111 to prevent the rotor 130 and the sealer 140 from being released from the housing 110.

A first annular protruding portion (or first annular protrusion) 1413 and a second annular protruding portion (or second annular protrusion) 1411 may be formed on an upper surface of the sealing base 1410. For example, the first annular protruding portion 1413 and the second annular protruding portion 1411 may be formed to support the gasket 1420 at a plurality of different points. In one implementation, the sealer base 1410 may include a first annular protruding portion 1413 spaced apart from the rotation shaft 1340 of the rotor to support the gasket 1420, and a second annular protruding portion 1411 spaced apart from the first annular protruding portion 1413 to support the gasket 1420.

In one implementation, the first and second annular protruding portions 1413, 1414 may each have a cylindrical shape.

In one example, the second annular protruding portion 1411 may be formed to protrude upward from an edge of the sealer base by a predetermined height. Referring to FIG. 7, the first annular protruding portion 1413 may be formed closer to the rotation shaft than the second annular protruding portion 1411. For example, the second annular protruding portion 1411 is provided on an outer side of the first annular protruding portion 1413 with respect to the rotation shaft 1340.

In one embodiment, the second annular protruding portion 1411 may be formed to protrude more than the first annular protruding portion 1413 from one side of the sealer base. For example, one end at a side of the sealer cover 1430 of the second annular protruding portion 1411 may be located above one end at a side of the sealer cover 1430 of the first annular protruding portion 1413. In addition, a first portion of the gasket 1420 in contact with the first annular protruding portion 1413 may be formed thicker than a second portion of the gasket 1420 in contact with the second annular protruding portion 1411.

In one implementation, an area in which the second annular protruding portion 1411 is brought into contact with the gasket 1420 may be formed to be larger than an area in which the first annular protruding portion 1413 is brought into contact with the gasket 1420. In one implementation, a first opening may be formed at the center of the sealing base 1410 to penetrate the rotation shaft, and the first annular protruding portion 1413 may be formed closer to the first opening than the second annular protruding portion 1411.

The first portion (or inner region) 1412 of the sealing base 1410 may extend between a circumference of the first opening and an inner circumferential surface of the first annular protruding portion 1413 and may be formed thicker than the second portion (or outer region) 1415 of the sealing base 1410 extending between an outer circumferential surface of the first annular protruding portion 1413 and an inner circumferential surface of the second annular protruding portion 1411.

Referring to FIG. 7, the sealer cover 1430 may include a first vertical wall 1434 spaced apart from the rotation shaft 1340 in a cylindrical shape and a second vertical wall 1432 spaced apart from the first vertical wall 1434 in a cylindrical shape. As illustrated in FIG. 7, the first vertical wall 1434 may be formed to protrude upward from a first horizontal plate 1435 (e.g., away from the sealing base 1410), as described below. The second vertical wall 1432 may be formed to protrude downward from a second horizontal plate 1436 (e.g., toward the sealing base 1410), as described later. Furthermore, the first and second vertical walls 1434, 1432 may be formed in an annular shape or a cylindrical shape.

Moreover, the sealer cover 1430 may include the first horizontal plate 1435 coupled to an inner side of the first vertical wall 1434 and the second horizontal plate 1435 coupled to an outer side of the first vertical wall 1434 and an inner side of the second vertical wall 1432. The first vertical wall 1434 may be positioned between the first horizontal plate 1435 and the second horizontal plate 1436, and the first horizontal plate 1435 may be positioned below the second horizontal plate 1436. In one embodiment, the first horizontal plate 1435 may be coupled to the first vertical wall 1434 to be axially spaced from the second horizontal plate 1436 and the rotation shaft 1340.

Referring to FIG. 7, a second opening is formed at the center of the first horizontal plate 1435 to penetrate the rotation shaft 1430. Furthermore, the sealer cover 1430 may include a first rib 1433 extended in an axial direction of the rotation shaft 1430 at one inner side of the first horizontal plate 1435 with respect to the rotation shaft 1430 and spaced apart from the rotation shaft 1430 to face the rotation shaft 1430. The first rib 1433 may be formed at a predetermined angle with respect to the first vertical wall 1434 or the second vertical wall 1432 and may be formed in a shape biased toward the rotation shaft 1340.

Moreover, the sealer cover 1430 may include a second rib 1437 protruded from an outer surface of the first horizontal plate 1435 toward the gasket 1420. For example, the second rib 1437 may be provided between the first rib 1433 and the first vertical wall 1434, and may be formed to be brought into contact with the gasket 1420.

In one embodiment, a portion of the gasket 1420 in contact with the second rib 1437 may correspond to a portion of the gasket 1420 in contact with the first annular protruding portion 1413. For example, a first region of the outer surface of the gasket 1420, which is in contact with the second rib 1437, and a second region of the outer surface of the gasket 1420, which is in contact with the first annular protruding portion 1413, may be formed at positions facing each other. As shown in FIG. 7, a distance between the center point of the first area and the rotation shaft 1340 may correspond to a distance between the center point of the second area and the rotation shaft 1340. On the other hand, a width of the second rib 1437 may be less than a width of the first annular protruding portion 1413, and thus, an area of the first region 1437 may be formed smaller than that of the second region 1413.

As described above, the second rib 1437 and the first annular protruding portion 1413 may be formed so that the centers of the first region and the second region correspond to each other and a width of the second rib 1437 may be formed shorter than that of the first annular protruding portion 1413, thereby preventing a portion where the gasket 1420 and the first annular protruding portion 1413 are brought into contact with each other from being excessively refracted.

Referring to FIG. 7, the second vertical wall 1432 may be formed at an edge portion of the sealing cover 1430 to be bent in the direction of the sealing base 1410 and inserted into an outer circumferential surface of the second annular protruding portion 1411. A connection portion 1424 of the gasket 1420 is closely adhered and fixedly coupled between an outer circumferential surface of the second annular protruding portion 1411 and an inner circumferential surface of the second vertical wall 1432. In addition, a fixed portion (or exterior extension) 1425 of the gasket 1420 is pressed and fixed between an outer plane of the second annular protruding portion 1411 and an end surface of the second vertical wall 1432 corresponding thereto. An end of the fixed portion 1425 of the gasket 1420 may be protruded slightly outward from an outer circumferential surface of the sealing base 1410 and the sealing cover 1430 to be elastically sealingly in contact with an inner circumferential surface of the rotor receiving groove 1111.

In one embodiment, the second vertical wall 1432 of the sealing cover may be inserted into an inner surface of the first housing 1110. Referring to FIG. 7, the gasket 1420 may include a gasket body 1424 in contact with the sealing cover 1430 and the sealing base 1410, and a close contact portion (interior extension) 1423 provided on an inner side of the gasket body with respect to the rotation shaft 1340 to be in contact with the rotation shaft 1340, and a fixed portion (or exterior extension) 1425 provided outside the gasket body 1424 to support the gasket body 1424.

A third opening for allow the rotation shaft 1340 to pass therethrough is formed at the center of the close contact portion 1424, and an inner circumferential surface of the third opening may be formed to be in contact with an outer circumferential surface of the rotation shaft 1340. In particular, the close contact portion 1423 may include a plurality of branch members (or branches) 1421 extended from the gasket body 1424.

In one embodiment, the plurality of branch members 1421 may include a first branch member extended upward from the gasket body and a second branch member extended downward from the gasket body. In another embodiment, the plurality of branch members 1421 may further include a third branch member positioned between the first and second branch members.

In one example, a portion of the plurality of branch members 1421 in contact with an outer circumferential surface of the rotation shaft 1340 may be formed to have a thickness that is less than a thickness of a portion of the plurality of branch members connected to the gasket body. Furthermore, the plurality of branch members 1421 may be brought into contact with an outer circumferential surface of the rotation shaft 1340 to form at least one sealing space.

Referring to FIG. 7, a gap maintaining protrusion 1414 may be formed in an annular shape at a position corresponding to the second annular protruding portion 1411 on a bottom surface of the sealing base 1410, that is, a surface facing the rotor 130, to maintain a gap with the rotor 130.

In addition, a bearing bush 1440 made of a metal may be provided in the first opening formed on the sealing base 1410. The bearing bush 1440 may include a journal bearing portion 1441 inserted into the first opening to support the rotation shaft 1340 in a journal direction and a thrust bearing portion 1442 bent and formed from the journal bearing portion 1441 and placed on a front end surface of the first opening and slidably in contact with an upper surface of the rotor 130 to support the rotation shaft 1340 in a thrust direction. In one implementation, the bearing bush 1440 may be provided in the first opening of the sealing cover 1430 as well as in the bearing hole 1412 of the sealing base 1410.

Figure 8:
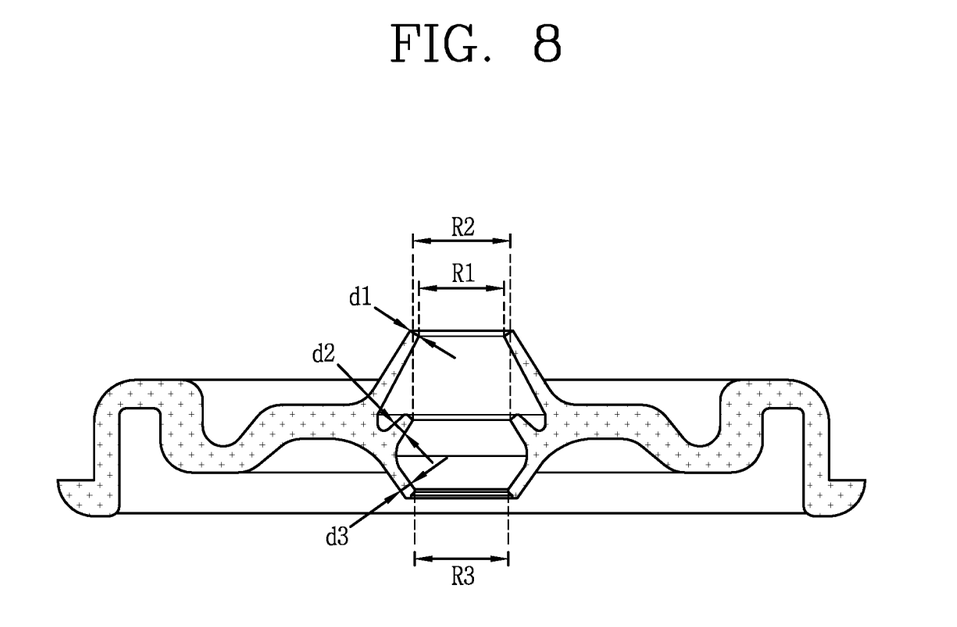
FIG. 8 is a longitudinal cross-sectional view showing the sealer according to an embodiment of the present disclosure illustrated in FIG. 7.

Referring to FIG. 8, a longitudinal cross-sectional view is shown before the gasket 1420 is coupled to the sealer 140. As illustrated in FIG. 8, three branch members 1421 included in the gasket 1420, before being coupled to the sealer 140, may form three circles. The diameter (R1) of a circle formed by a first branch member (e.g., one of the branch members 1421 positioned closest to the impeller 200) may be formed greater than the diameters (R2, R3) of a circle formed by the other two branch members 1421. Additionally, the diameter (R3) of a circle formed by a second branch member (e.g., one of the branch members 1421 positioned furthest from the impeller 200) may be formed to be greater than the diameter (R2) of a circle formed by a third branch member located at the center (e.g., between the first and second branch members). Moreover, a width (d1) of an end of the first branch member may be formed smaller than the respective widths (d2, d3) of the ends of the other two branch members.

Figure 9:
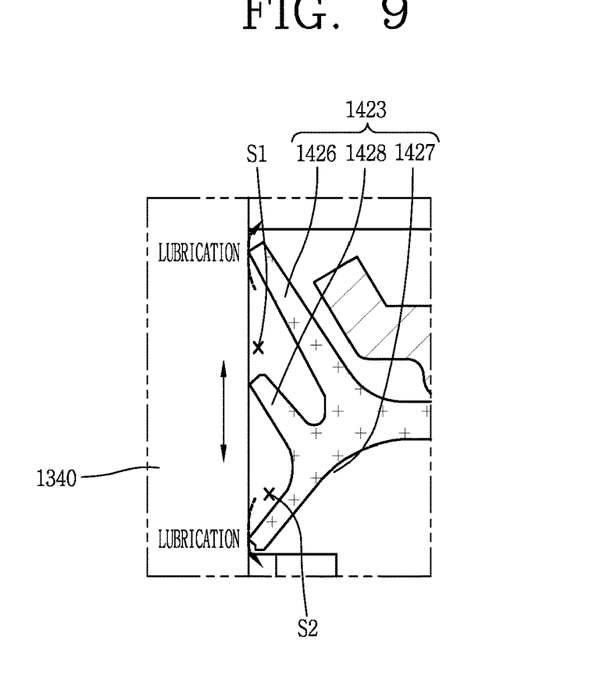
FIG. 9 is a longitudinal cross-sectional view showing a process of supplying lubricant to the sealer according to an embodiment of the present disclosure.

Referring to FIG. 9, a lubricant storage portion (or lubricant storing space) to receive and store a lubricant may be formed in a third opening formed on the gasket 1420. The lubrication storage portion may be partitioned into a plurality of storage spaces along the axial direction to retain lubricant for a long period of time. For example, a close contact portion 1423 of the gasket 1420 may be brought into contact with an outer circumferential surface of the rotation shaft 1340 at two or three points (e.g., at the ends of the branch members 1421) to form the lubricant storage portion. The gasket body 1424 may laterally extend from the close contact portion 1423, and the fixed portion 1425 formed at a radial end of the gasket body 1424 may be brought into contact with the rotor receiving groove 1111 to seal the rotor receiving groove 1111.

For the close contact portion 1423, a first branch member 1426 may be formed in the impeller direction, and a second branch member 1427 branched from the first branch member 1426 may be formed in the rotor direction. A third branch member 1428 may be located between the first and second branch members and may extended laterally to form a first storage space (S1) between the first branch member 1426 and the third branch member and a second storage space (S2) between the second branch member 1427 and the third branch member.

As shown in FIG. 6, the impeller 200 may include a boss portion 210, a plurality of blade portions 220, and a flange portion 230. The boss portion 210 may be coupled to the rotation shaft 1340 of the drain pump 100, and the blade portions 220 may extended radially from an outer circumferential surface of the boss portion 210. A flange portion (or impeller base) 230 may be formed in a flat plate shape that extends between the blade portions 210.

Figure 10:
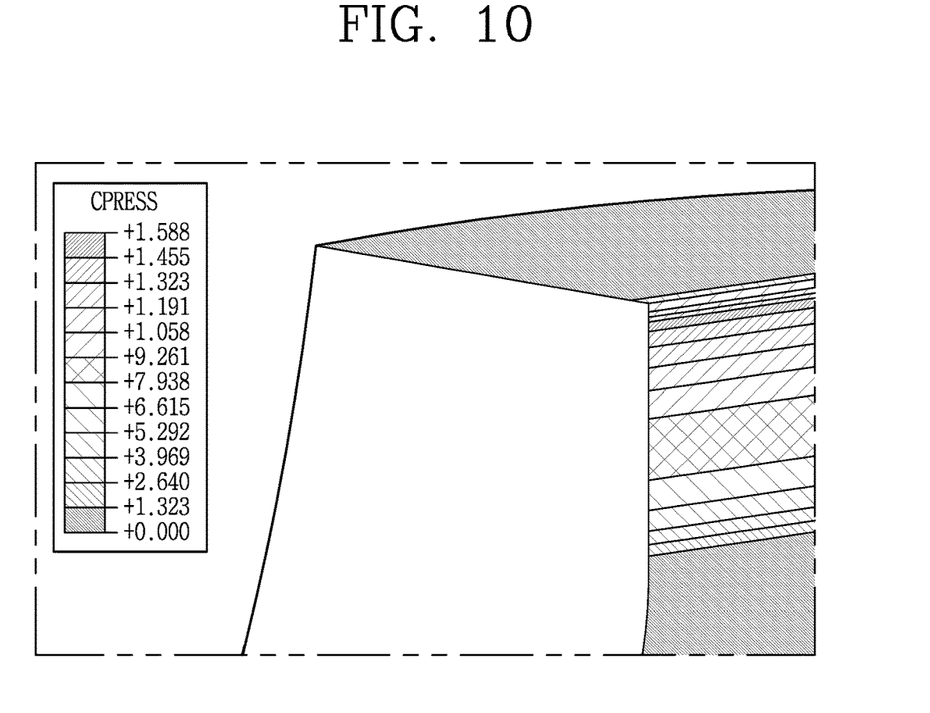
FIG. 10 is a conceptual view showing a contact surface between the sealer and the rotor according to an embodiment of the present disclosure shown in FIG. 7.

Referring to FIG. 10, a pressure applied to a contact portion of the rotation shaft 1340 on an outer surface of the branch member 1421 is illustrated in detail. The branch member 1421 in one example may have a smaller thickness in the direction toward the rotation shaft 1340, and an end of the branch member 1421 may be formed to have a predetermined thickness so as to exhibit a maximum sealing force.

As shown in FIG. 7, the first annular protruding portion (or annular protrusion 1413 may be formed closer to the rotation shaft than the second annular protruding portion. For example, the second annular protruding portion may be provided on an outer side than the first annular protruding portion with respect to the rotation shaft.

In one embodiment, the second annular protruding portion may further be protruded from one surface of the sealer base than the first annular protruding portion. In one embodiment, a first portion of the gasket in contact with the first annular protruding portion may be formed thicker than a second portion of the gasket in contact with the second annular protruding portion. In one embodiment, an area of the second annular protruding portion in contact with the gasket may be formed larger than an area of the first annular protruding portion in contact with the gasket.

In one embodiment, a first opening may be formed at the center of the sealing base to allow the rotation shaft to pass therethrough, and the first annular protruding portion may be formed closer to the first opening than the second annular protruding portion. In one embodiment, a first portion of the sealing base existing between a circumference of the first opening and an inner circumferential surface of the first annular protruding portion may be formed thicker than a second portion of the sealing base existing between an outer circumferential surface of the first annular protruding portion and an inner circumferential surface of the second annular protruding portion.

In one embodiment, the sealer cover may include a first vertical wall spaced apart from the rotation shaft to have a cylindrical shape, a second vertical wall spaced apart from the first vertical wall to have a cylindrical shape, a first horizontal plate coupled to an inner side of the first vertical wall, and a second horizontal plate coupled to an outer side of the first vertical wall and to an inner side of the second vertical wall.

In one embodiment, a second opening may be formed at the center of the first horizontal plate to allow the rotation shaft to pass therethrough, and the sealer cover may include a first rib extended in an axial direction of the rotation shaft from an inner end of the first horizontal plate with respect to the rotation shaft, and spaced apart from the rotation shaft to face the rotation shaft. In one embodiment, the sealer cover may include a second rib protruded from an outer surface of the first horizontal plate toward the gasket.

In one embodiment, the second rib may be provided between the first rib and the first vertical wall, and formed in contact with the gasket. In one embodiment, a portion of the gasket in contact with the second rib may correspond to a portion of the gasket in contact with the first annular protruding portion. In one embodiment, an area of the second rib in contact with the gasket may be formed smaller than an area of the first annular protruding portion in contact with the gasket.

In one embodiment, the first horizontal plate may be coupled to the first vertical wall to be spaced apart from the second horizontal plate on an axial direction of the rotation shaft. In one embodiment, the second vertical wall may be protruded from an outer surface of the second horizontal plate toward the gasket. In one embodiment, the second vertical wall may be inserted into an inner surface of the first housing 1110.

In one embodiment, the gasket may include a gasket body in contact with the sealing cover and the sealing base, a close contact portion provided on an inner side of the gasket body with respect to the rotation shaft to be brought into contact with the rotation shaft, and a fixed part provided on an outer side of the gasket body with respect to the rotation shaft to support the gasket body.

In one embodiment, a third opening may be formed at the center of the close contact portion to allow the rotation shaft to pass therethrough, and an inner circumferential surface of the third opening may be formed in contact with an outer circumferential surface of the rotation shaft. In one embodiment, the close contact portion may include a plurality of branch members extended from the gasket body in a plurality of branches. In one embodiment, the plurality of branch members may include a first branch member extended upward from the gasket body, and a second branch member extended downward from the gasket body.

In one embodiment, a portion of the plurality of branch members in contact with an outer circumferential surface of the rotation shaft may be formed to have a thickness lower than a portion of the plurality of branch members connected to the gasket body. In one embodiment, the plurality of branch members may further include a third branch member extended between the first branch member and the second branch member. In one embodiment, the plurality of branch members may be brought into contact with an outer circumferential surface of the rotation shaft to form at least one sealing space.

According to aspects of the present disclosure, the sealer surrounding the rotor may be configured to move together with the movement of the rotor, thereby obtaining an effect of stably supporting the rotor. For example, the structure of the sealer may improve the durability of the motor and prevent the failure of the motor. Furthermore, according to the present disclosure, preventing a water flow into the motor constituting the drain pump may be obtained. In addition, according to the present disclosure, the amount of water flowing into the motor may reduce the amount of water, thereby improving the life of the motor of the drain pump.

An aspect of the present disclosure improves the structure of a sealer provided in the drain pump, thereby preventing water inflow to the rotor side of the drain pump. Furthermore, another aspect of the present disclosure improves the structure of a sealer to allow the sealer to flow according to the movement of the rotor. In addition, still another aspect of the present disclosure is to provide a sealer with an improved structure in order to enhance the follow-up of the sealer with respect to the axial movement of the rotor.

In order to accomplish certain aspects of the present disclosure, the present disclosure proposes an improved structure of a sealer having a sealer cover, a gasket and a sealer base. For example, Specifically, the sealer base according to the present disclosure may be formed to support the gasket at a plurality of different points. In other words, the sealer base may include a first annular protruding portion spaced apart from a rotation shaft of the rotor to support the gasket, and a second annular protruding portion spaced apart from the first annular protruding portion to support the gasket.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present application.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this specification belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the specification. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor, comprising:
   a first housing having an opening;
   a rotor including a rotation shaft extending in an axial direction, inserted into the opening and rotatably provided outside the first housing;
   a second housing coupled to the first housing to form a predetermined space together with an outer circumferential surface of the opening;
   a stator fixedly provided in the space; and
   a seal coupled to the first housing and positioned to surround the rotation shaft,
   wherein:
      the rotation shaft protrudes from the rotor and extends in an axial direction,
      the seal includes:
         a sealing base rotatably coupled to the rotation shaft,
         a gasket positioned to contact a plurality of points on an outer circumferential surface of the rotation shaft, and a sealing cover coupled to the sealing base to fix the gasket to the sealing base, and the sealing base includes a first annular protrusion and a second annular protrusion that are radially spaced from the rotation shaft and are positioned to support the gasket, the sealing cover includes:
- a first vertical wall spaced apart from the rotation shaft to have a cylindrical shape,
- a second vertical wall spaced apart from the first vertical wall to have a cylindrical shape,
- a first horizontal plate coupled to an inner side of the first vertical wall,
- a second horizontal plate coupled to an outer side of the first vertical wall and to an inner side of the second vertical wall, and
- a rib protruded from an outer surface of the first horizontal plate and toward the gasket, and
- a portion of the gasket in contact with the rib corresponds to a portion of the gasket in contact with the first annular protrusion.

2. The motor of claim 1, wherein the first annular protrusion is formed radially closer to the rotation axis than the second annular protrusion.

3. The motor of claim 2, wherein the first annular protrusion and the second annular protrusion extend from a surface of the sealing base facing the gasket.

4. The motor of claim 3, wherein the second annular protrusion is further protruded from the surface of the sealing base than the first annular protrusion.

5. The motor of claim 2, wherein the gasket has a thickness adjacent to the first annular protrusion that is relatively greater than a thickness adjacent to the second annular protrusion.

6. The motor of claim 5, wherein an area of a surface of the second annular protrusion in contact with the gasket is relatively larger than an area of a surface of the first annular protrusion in contact with the gasket.

7. The motor of claim 2, wherein:
- a first opening is formed at a center of the sealing base,
- the rotation shaft passes through the first opening, and
- the first annular protrusion is formed closer to the first opening than the second annular protrusion.

8. The motor of claim 7, wherein the sealing base has a thickness that is relatively greater between a circumference of the first opening and an inner circumferential surface of the first annular protrusion than between an outer circumferential surface of the first annular protrusion and an inner circumferential surface of the second annular protrusion.

9. The motor of claim 1, wherein:
- a second opening is formed at a center of the first horizontal plate,
- the rotation shaft passes through the second opening, and
- the sealing cover further includes another rib extending radially inward toward the rotation shaft from an inner end of the first horizontal plate and spaced apart from the rotation shaft.

10. The pump motor of claim 9, wherein the rib protruded from the outer surface of the first horizontal plate is provided between the other rib and the first vertical wall, and is formed to contact the gasket.

11. The motor of claim 10, wherein an area of a surface, of the rib protruded from the outer surface of the first horizontal plate, in contact with the gasket is smaller than an area of a surface of the first annular protrusion in contact with the gasket.

12. The motor of claim 1, wherein the first horizontal plate is coupled to the first vertical wall and spaced apart from the second horizontal plate on an axial direction of the rotation shaft.

13. The motor of claim 12, wherein the second vertical wall is protruded from an outer surface of the second horizontal plate and toward the gasket.

14. The motor of claim 13, wherein the second vertical wall is inserted into an inner surface of the first housing.

15. The motor of claim 1, wherein the gasket includes:
- a gasket body in contact with the sealing cover and the sealing base,
- an interior extension protruding from an inner surface of the gasket body with respect to the rotation shaft to be brought into contact with the rotation shaft, and
- an exterior extension provided on an outer surface of the gasket body with respect to the rotation shaft to support the gasket body.

16. The pump motor of claim 15,
wherein:
- a third opening is formed at the center of the interior extension to allow the rotation shaft to pass therethrough,
- an inner circumferential surface of the third opening is formed in contact with an outer circumferential surface of the rotation shaft, and
- the exterior extension includes a plurality of branches extending from the gasket body, and
wherein at least one of the branches extends toward the rotation shaft.

17. The pump motor of claim 16, wherein the branches form one or more spaces to store a lubricant adjacent to the rotation shaft.

18. The motor of claim 1, wherein a distance between the second horizontal plate and the sealing base is greater than a distance between the first horizontal plate and the sealing base.

19. The motor of claim 1, wherein a width of the rib is less than a width of the first annular protrusion.

20. The motor of claim 1, further comprising an impeller coupled to the rotation shaft.

21. A motor, comprising:
- a first housing having an opening;
- a rotor including a rotation shaft extending in an axial direction, inserted into the opening and rotatably provided outside the first housing;
- a second housing coupled to the first housing to form a space together with an outer circumferential surface of the opening;
- a stator fixedly provided in the space; and
- a seal coupled to the first housing and positioned to surround the rotation shaft,
wherein:
- the rotation shaft protrudes from the rotor and extends in an axial direction,
- the seal includes:
  - a sealing base rotatably coupled to the rotation shaft,
  - a gasket positioned to contact a plurality of points on an outer circumferential surface of the rotation shaft, and
  - a sealing cover coupled to the sealing base to fix the gasket to the sealing base,
- the sealing base includes an annular protrusion positioned to support the gasket, the gasket includes:
- a gasket body in contact with the sealing cover and the sealing base, and
- at least one branch, of a plurality of branches extending from the gasket body, to contact the rotation shaft, the sealing cover includes:
- a first vertical wall spaced apart from the rotation shaft to have a cylindrical shape,
- a second vertical wall spaced apart from the first vertical wall to have a cylindrical shape,
- a first horizontal plate coupled to an inner side of the first vertical wall,
- a second horizontal plate coupled to an outer side of the first vertical wall and to an inner side of the second vertical wall, and
- a rib protruded from an outer surface of the first horizontal plate and toward the gasket, and a portion of the gasket in contact with the rib corresponds to a portion of the gasket in contact with the annular protrusion.

\* \* \* \* \*